United States Patent
Hu et al.

(10) Patent No.: US 10,203,591 B2
(45) Date of Patent: Feb. 12, 2019

(54) WAVELENGTH CONVERSION DEVICE, LIGHT-EMITTING DEVICE AND PROJECTION SYSTEM

(71) Applicant: APPOTRONICS CORPORATION LIMITED, Shenzhen (CN)

(72) Inventors: Fei Hu, Shenzhen (CN); Jiayi Yang, Shenzhen (CN); Yi Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 384 days.

(21) Appl. No.: 14/770,027

(22) PCT Filed: Mar. 3, 2014

(86) PCT No.: PCT/CN2014/072789
§ 371 (c)(1),
(2) Date: Aug. 24, 2015

(87) PCT Pub. No.: WO2014/135041
PCT Pub. Date: Sep. 12, 2014

(65) Prior Publication Data
US 2016/0004147 A1 Jan. 7, 2016

(30) Foreign Application Priority Data

Mar. 5, 2013 (CN) .......................... 2013 1 0069688

(51) Int. Cl.
*F21V 9/16* (2006.01)
*G03B 21/20* (2006.01)
(Continued)

(52) U.S. Cl.
CPC ......... *G03B 21/204* (2013.01); *G02B 26/008* (2013.01); *G03B 21/206* (2013.01); *G03B 21/2066* (2013.01); *H04N 9/315* (2013.01)

(58) Field of Classification Search
CPC ................ G03B 21/204; G03B 21/206; G03B 21/2066; H04N 9/315; G02B 26/008
(Continued)

(56) References Cited

U.S. PATENT DOCUMENTS 8,283,843 B2  10/2012  Pan et al.
2004/0207998 A1* 10/2004 Suehiro ................. H01L 33/501
362/84
(Continued)

FOREIGN PATENT DOCUMENTS

CN  102563410 A  7/2012
CN  102606980 A  7/2012
(Continued)

OTHER PUBLICATIONS

International Search Report in the parent PCT application No. PCT/CN2014/072789, dated May 6, 2014.
(Continued)

*Primary Examiner* — Anh Mai
*Assistant Examiner* — Jessica M Apenteng
(74) *Attorney, Agent, or Firm* — Chen Yoshimura LLP

(57) ABSTRACT

Disclosed are a wavelength conversion device, a light-emitting device and a projection system, comprising a wavelength conversion layer having a first surface and a second surface opposite each other. The first surface receives an excitation light. The wavelength conversion layer absorbs the excitation to produce a converted light and emits the converted light or the mixture of the converted light and the excitation light from the first surface and the second surface. A scattering reflective substrate is stacked with the wavelength conversion layer and includes a white porous ceramic or a white scattering material for scattering the incident light. The scattering reflective substrate includes a third surface facing the second surface and scatters at least a part
(Continued)

of the incident light on the third surface and then emits all the light from the third surface to the second surface.

14 Claims, 4 Drawing Sheets

(51) Int. Cl.
*H04N 9/31* (2006.01)
*G02B 26/00* (2006.01)

(58) Field of Classification Search
USPC .......................................................... 362/84
See application file for complete search history.

(56) References Cited

U.S. PATENT DOCUMENTS

| | | |
|---|---|---|
| 2010/0245777 A1 | 9/2010 | Ogura |
| 2010/0258831 A1 | 10/2010 | Jagt et al. |
| 2011/0025190 A1 | 2/2011 | Jagt |
| 2011/0096526 A1* | 4/2011 | Katabe .................. H01L 33/507 362/84 |
| 2011/0116263 A1 | 5/2011 | Cillessen et al. |
| 2011/0199580 A1 | 8/2011 | Hirata et al. |
| 2011/0210658 A1 | 9/2011 | Pan et al. |
| 2012/0127435 A1 | 5/2012 | Kitano et al. |
| 2012/0179342 A1 | 7/2012 | Noumura et al. |
| 2013/0194551 A1* | 8/2013 | Zhang ...................... F21V 9/00 353/31 |
| 2013/0270992 A1 | 10/2013 | Gleitsmann |
| 2013/0314672 A1 | 11/2013 | Ogura |
| 2014/0168940 A1 | 6/2014 | Shiomi et al. |

FOREIGN PATENT DOCUMENTS

| | | |
|---|---|---|
| CN | 102606981 A | 7/2012 |
| CN | 202351606 U | 7/2012 |
| CN | 102645826 A | 8/2012 |
| CN | 102709449 A | 10/2012 |
| CN | 102782089 A | 11/2012 |
| JP | 2007-121613 A | 5/2007 |
| JP | 2007-149776 A | 6/2007 |
| JP | 2010-237443 A | 10/2010 |
| JP | 2011-198560 A | 10/2011 |
| JP | 2011-529266 A | 12/2011 |
| JP | 2012-108486 A | 6/2012 |
| JP | 2013-143436 A | 7/2013 |
| KR | 2010-0108550 A | 10/2010 |
| KR | 2011-0031994 A | 3/2011 |
| KR | 2012-0113115 A | 10/2012 |
| WO | 2011-021089 A2 | 2/2011 |
| WO | 2012084440 A1 | 6/2012 |
| WO | 2012138020 A1 | 10/2012 |
| WO | 2013-001953 A1 | 1/2013 |

OTHER PUBLICATIONS

IPRP in the parent PCT application No. PCT/CN2014/072789, dated Sep. 8, 2015.
Extended European Search Report, dated Sep. 7, 2016 in corresponding application EP 14760724.6.
Schubert et al., "Solid-State Light Sources Getting Smart", Science, vol. 308, No. 5726, May 27, 2005, pp. 1274-1278.
Ku et al., "Diffuse reflection of ceramics coated with dielectric thin films", Applied Optics, vol. 42, No. 7, Mar. 1, 2003, pp. 1352-1359.
Chinese Office Action, dated Mar. 18, 2015, and Search Report dated Mar. 10, 2015, in a counterpart Chinese patent application, No. CN 201310069688.4.
Japanese Office Action, dated Jul. 12, 2016 in a counterpart Japanese patent application, No. JP 2015-560534.
Japanese Office Action, dated Mar. 28, 2017 in a counterpart Japanese patent application, No. JP 2015-560534.
Japanese Office Action, dated Oct. 31, 2017 in a counterpart Japanese patent application, No. JP 2015-560534.
Korean Office Action, dated Jul. 18, 2016 in a counterpart application KR 10-2015-7023551.
Korean Office Action, dated Jan. 26, 2017 in a counterpart application KR 10-2015-7023551.
Korean Office Action, dated Jun. 12, 2017 in a counterpart application KR 10-2015-7023551.
Taiwanese Office Action, dated Feb. 4, 2015, in a counterpart Taiwanese patent application, No. TW 103106827.

* cited by examiner

WAVELENGTH CONVERSION DEVICE, LIGHT-EMITTING DEVICE AND PROJECTION SYSTEM

BACKGROUND OF THE INVENTION

Field of the Invention

This invention relates to illumination and display technologies, and in particular, it relates to a wavelength conversion device, light-emitting device and projection system.

Description of Related Art

Technologies using a laser or LED light source to excite a phosphor material to generate a desired single color or multi-color light have been widely used in illumination source, projection display and other application fields. Typically, the light emitted from the laser or LED illuminates a phosphor color wheel to achieve good heat dissipation.

Due to its high light utilization efficiency, reflection type color wheels are more commonly used in the type of illumination devices described above. For example, FIG. 1 shows the structure of a conventional reflection type color wheel. As shown in FIG. 1, a phosphor layer 110 is disposed on a substrate 120. The substrate 120 includes a base plate 121. To improve the reflectivity of the substrate 120 for the output light of the phosphor layer 110, the surface of the base plate 121 in conventional reflection type color wheel is treated with a silver plating technique, to reflect light incident on the surface. Specifically, the surface of the base plate 121 (such as glass or aluminum plate) is provided with a silver plating layer 122, and then coated with a transparent material (such as aluminum oxide) coating 123 to function as a anti-oxidation protective layer for the silver. The surface of the silver plating layer 122 has a very high reflectivity, up to 99%. This is very important in the reflection type phosphor wheel applications, and can typically satisfy general requirements.

However, when the power of the excitation light increases, the light output efficiency of conventional reflection type color wheel can decrease significantly.

SUMMARY

An object of the present invention is to provide a reflection type wavelength conversion device that is high temperature resistant and has high reflectivity, and related light emitting device and projection system.

An embodiment of the present invention provides a wavelength conversion device, including:

a wavelength conversion layer, having a first surface and a second surface opposite each other, wherein the first surface is for receiving an excitation light, wherein the wavelength conversion layer absorbs the excitation light to generate a converted light, and outputs the converted light or a mixed light of the converted light and the excitation light from the first surface and the second surface;

a scattering reflective substrate which is stacked with the wavelength conversion layer, the scattering reflective substrate including a white porous ceramic or a white scattering material, the white scattering material being a salt or an oxide, the white porous ceramic or white scattering material scattering a light incident on it, wherein the scattering reflective substrate has a third surface facing the second surface, the scattering reflective substrate scattering at least a portion of the light incident on the third surface and outputting all of the light incident on the third surface to the second surface.

Preferably, the wavelength conversion device further includes a drive device for driving the wavelength conversion layer and the scattering reflective substrate to move, so that a light spot of the excitation light formed on the wavelength conversion layer acts upon the wavelength conversion layer along a predetermined path.

Preferably, the scattering reflective substrate includes a white porous ceramic plate.

Preferably, diameters of the pores of the white porous ceramic plate are less than or equal to 1 micron.

Preferably, the scattering reflective substrate further includes a metal plate, located on and is in tight contact with the surface of the white porous ceramic plate that faces away from the wavelength conversion material.

Preferably, the scattering reflective substrate includes a scattering reflective layer and a base plate stacked together, wherein the scattering reflective layer includes a white scattering material, and is located between the base plate and the wavelength conversion layer and affixed to the base plate, wherein the surface of the scattering reflective layer that faces the wavelength conversion layer is the third surface of the scattering reflective substrate, wherein the scattering reflective layer scatters all of the light incident on the third surface and outputs all of the scattered light from the third surface.

Preferably, the scattering reflective substrate includes a scattering reflective layer and a base plate stacked together; wherein the scattering reflective layer includes a white scattering material, and is located between the base plate and the wavelength conversion layer and affixed to the base plate, wherein the surface of the scattering reflective layer that faces the wavelength conversion layer is the third surface of the scattering reflective substrate, and a surface of the scattering reflective layer opposite the third surface is the fourth surface, wherein the scattering reflective layer scatters a portion of the light incident on the third surface and outputs the scattered light from the third surface and the fourth surface, and further transmits the remaining portion of the light incident on the third surface via the fourth surface; wherein the base plate is a reflecting mirror plate, which reflects the light incident on it form the fourth surface of the scattering reflective layer back to the fourth surface.

Preferably, the reflectivity of the reflecting mirror plate is R, the scattering reflective layer scatters a portion of the light incident on the third surface and outputs the scattered light from the third surface and the fourth surface, wherein the ratio of the light scattered and outputted from the third surface to the light incident on the third surface is P, wherein $(1-R)(1-P) \geq 10\%$, and wherein $R \geq 50\%$.

Preferably, the wavelength conversion layer includes a first glass material and a wavelength conversion material, wherein the scattering reflective layer includes a second glass material and a white scattering material, and wherein the melting point of the first glass material is lower than the melting point of the second glass material.

Preferably, the wavelength conversion layer includes a wavelength conversion material and an inorganic adhesive, wherein the inorganic adhesive adheres the wavelength conversion material into a solid mass.

The present invention further provides a light emitting device, the light emitting device includes the above described wavelength conversion device, wherein the excitation light received by the first surface of the wavelength conversion device is from a first light source.

Preferably, the first light source is a laser source, for outputting a laser excitation light to the first surface of the wavelength conversion device, wherein the wavelength conversion device receives the laser excitation light and converts a portion of the laser excitation light to the converted light, and scattering reflects the un-absorbed laser excitation light, wherein the converted light and the un-absorbed laser excitation light are output from the first surface.

Preferably, the light emitting device further includes a second light source and a light combination device;

wherein the first light source is a laser source, for outputting a first color light; the second light source is a laser source, for outputting a second color light; wherein the first color light is the excitation light;

wherein the light combination device includes a first region and a second region surrounding the first region, wherein the first color light and the second color light are incident on the first region of the light combination device from the same direction;

wherein the first region has the optical property that transmits the first color light and the second color light, and the second region has the optical property that reflects the converted light and the second color light, and wherein the first color light and the second color light are transmitted through the first region to the first surface of the wavelength conversion device; or wherein the first region has the optical property that reflects the first color light and the second color light, and the second region has the optical property that transmits the converted light and the second color light, and wherein the first color light and the second color light are reflected by the first region to the first surface of the wavelength conversion device;

wherein the converted light or the mixed light of the converted light and the un-absorbed first color light is output from the first surface to the light combination device; wherein the wavelength conversion device does not absorb the second color light, and scattering-reflects the second color light and outputs it from the first surface to the light combination device.

Preferably, the light emitting device further includes a second light source and a light combination device;

wherein the first light source surrounds the second light source; the first light source outputs a first color light; the second light source is a laser source, for outputting a second color light; wherein the first color light is the excitation light;

wherein the light combination device includes a first region and a second region surrounding the first region, wherein the first color light and the second color light are respectively incident on the second region and first region of the light combination device from the same direction;

wherein the first region has the optical property that reflects the second color light, and the second region has the optical property that reflects the first color light and transmits the second color light and the converted light, and wherein the first color light and the second color light are respectively reflected by the second region and the first region to the first surface of the wavelength conversion device; or the first region has the optical property that transmits the second color light, and the second region has the optical property that transmits the first color light and reflects the second color light and the converted light, and wherein the first color light and the second color light are respectively transmitted through the second region and the first region to the first surface of the wavelength conversion device;

wherein the converted light or the mixed light of the converted light and the un-absorbed first color light is output from the first surface to the light combination device, wherein the wavelength conversion device does not absorb the second color light, and scattering-reflects the second color light and outputs it from the first surface to the light combination device.

The present invention further provides a projection system, which includes the above light emitting device.

Compared to conventional technologies, the devices of the present invention have the following advantages:

In embodiments of the present invention, the output light from the second surface of the wavelength conversion layer is incident on the third surface of the scattering reflective substrate, is scattered by the scattering reflective substrate, and returns to the second surface of the wavelength conversion layer via the third surface of the substrate. Ultimately, all light is output from the first surface of the wavelength conversion layer. The scattering reflection replaces at least a part of the mirror reflection, so that even under high temperature when the efficiency of the mirror reflection decreases, the scattering of the white scattering material does not change, and the scattering reflection efficiency of the scattering reflective substrate does not decrease, so the overall reflection rate does not decrease significantly. As a result, the wavelength conversion device has a high light utilization efficiency.

DETAILED DESCRIPTION OF PREFERRED EMBODIMENTS

Figure 1:
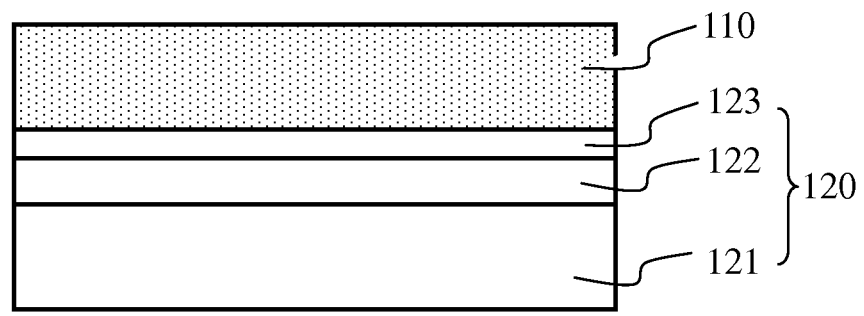
FIG. 1 illustrates the structure of a conventional reflection type color wheel.

Conventional reflection type wavelength conversion devices commonly use a metal plate coated with a high reflection layer, such as silver plating layer or aluminum plating layer. These devices achieve reflection of the incident light based on mirror reflection by the high reflection layer. For example, an aluminum reflection plate may be a polished aluminum plate; to slow down the process of oxidation which makes the surface dull, a transparent oxide film may be coated on its surface to seal it from air. To further increase reflectivity, the aluminum reflection plate may be further provided with a high purity aluminum film (aluminum plating layer) on the polished aluminum plate, and then a transparent oxide coating. Such an aluminum reflection plate can have a reflectivity over 90%.

One reason that metal plates with high reflection coating is widely used is that, in mirror reflection, the light rays obey the law of reflection, so the reflected light can be controlled and the light distribution of the incident light will not change. The control of the light is essential for optical design; for example, in a light source for a projector, the direction of the emitted light must be controlled. On the other hand, because the wavelength conversion layer produces a large amount of heat while generating the converted light, the substrate must have good heat conductivity. Metal plates have good heat conductivity and therefore can lower the temperature of the wavelength conversion layer.

However, the inventors of the present invention discovered through experimentation that, when the power of the excitation light is very high, the phosphor layer sometimes becomes black, and the light output efficiency of the wavelength conversion device is greatly reduced. Through further analysis, it was discovered that, when the power of the excitation light increases, the temperature of the phosphor material becomes higher and higher, even exceeding 100 degrees C. Under such conditions of prolonged high temperature operation, the silver plating layer will oxidize and becomes black, causing its reflectivity to drop. Although aluminum plating layer may be used in lieu of silver plating layer, the efficiency of aluminum plating layer is clearly lower; and although it does not become black under prolonged high temperature operation, it may oxidize and become dull, causing its reflectivity to drop to below 80%. Thus, both the silver plating layer and aluminum plating layer can suffer from oxidation, causing their reflectivity of the incident light to decrease, negatively impacting light utilization efficiency. However, currently it is difficult to find more suitable reflecting materials than silver plating layer and aluminum plating layer, and normal fabrication techniques cannot properly solve the oxidation problem.

This invention uses a new approach to solve this problem: it uses scattering reflection to replace mirror reflection, i.e., it uses scattering materials (such as white oxides) to replace high reflective layer to realize reflection, thus avoiding problems associated with oxidation of the high reflective layer. Moreover, the scattering material essentially does not absorb the incident light, which avoids light energy loss. Specifically, the scattering material scatters the incident light, and the scattered light has a Lambertian distribution, where approximately 50% of the light will travel in a direction opposite the incident direction, and the remaining approximately 50% of the light will travel in the incident direction. When the scattering material is sufficiently thick, the incident light is scattered multiple times, and ultimately becomes totally reflected. In addition, the scattered light from the scattering material has a Lambertian distribution, which is the same as the distribution of the output light of the wavelength conversion material, so it will not affect the light distribution of the wavelength conversion device.

Embodiments of the present invention are described in detail below with reference to the drawings.

Figure 2:
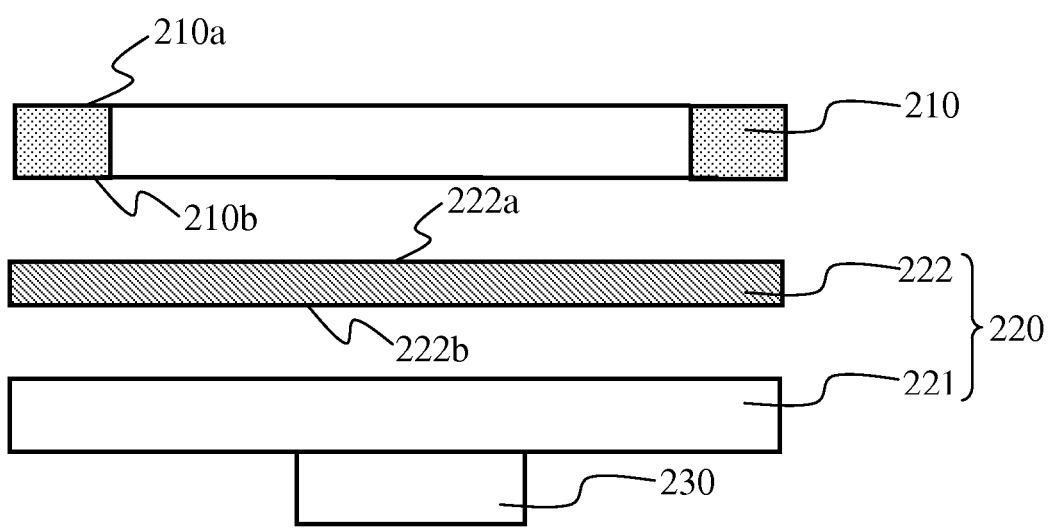
FIG. 2 is an exploded view of the structure of a wavelength conversion device according to an embodiment of the present invention.

FIG. 2 is an exploded view of the structure of a wavelength conversion device according to an embodiment of the present invention. As shown in FIG. 2, the wavelength conversion device includes stacked wavelength conversion layer 210 and scattering reflective substrate 220.

The wavelength conversion layer 210 includes a first surface 210a and a second surface 210b opposite to each other. The first surface 210a is used to receive the excitation light. The wavelength conversion layer 210 carries wavelength conversion materials, which can absorb the excitation light to generate a converted light. The converted light has a Lambertian distribution, and is output from the first surface 210a and the second surface 210b. The wavelength conversion material may be a phosphor; in other embodiments, the wavelength conversion material may also be quantum dots, fluorescent dye and other materials having wavelength conversion capabilities, in addition to phosphors.

In practice, the wavelength conversion material is typically adhered together with an adhesive material to form a solid mass. A typical adhesive material for this purpose is silica gel, which has stable chemical properties and relatively high mechanical strength. But the temperature resistance of silica gel is relatively low, typically between 300 and 500 degrees C. For high power light emitting devices, preferably, an inorganic adhesive may be used to adhere the wavelength conversion material into a solid mass, such as sodium silicate or glass dust, to form a reflection type phosphor wheel that can withstand high temperature. For example, the phosphor powder can be mixed with glass dust (if the temperature requirement is low, a low temperature glass dust may be used) and melted under an inert gas environment to form a desired shape.

The scattering reflective substrate 220 includes a stacked scattering reflective layer 222 and a base plate 221. The scattering reflective layer 222 is located between the base plate 221 and the wavelength conversion layer 210. The surface of the scattering reflective layer 222 adjacent the wavelength conversion layer 210 is the third surface 222a.

The scattering reflective layer 222 may include a white scattering material such as salt or oxide, such as barium sulfate powder, aluminum oxide powder, silica powder, etc., which are essentially non-absorbent of light. Moreover, the white scattering materials have stable properties and will not oxidize under high temperature.

The scattering reflective layer 222 is used to scatter all of the light incident onto the third surface 222a and output all of the scattered light form the third surface 222a. To achieve this, the scattering reflective layer 222 in this embodiment needs to be sufficiently thick, so that, when ignoring the light loss due to the slight absorption of light by the scattering material, all of the light output from the second surface 210b is scattering reflected by the scattering reflective layer 222 back to the wavelength conversion layer 210, and ultimately outputted from the first surface 210a of the wavelength conversion layer 210.

To affix the scattering reflective layer 222, the scattering reflective substrate 220 includes a base plate 221 to support the scattering reflective layer. When the scattering reflective layer itself has sufficient rigidity (for example, when the scattering material is mixed in a transparent glass material to form the layer), the base plate 221 can be omitted.

From the above description, it can be seen that in this embodiment, the wavelength conversion device uses the scattering reflection of the scattering reflective substrate 220 to replace the mirror reflection in conventional wavelength conversion devices, and achieves a reflective type scattering device; it uses white scattering material with stable properties to form a scattering reflecting layer, to replace a reflecting layer that is easily oxidized. This avoids the decrease in reflectivity caused by oxidation of the reflective layer, improving light utilization efficiency. Also, such a wavelength conversion device can be used in super-high power laser phosphor and other high power light emitting devices.

It should be pointed out that, the above stacked wavelength conversion layer 210 and scattering reflective substrate 220 are in direct contact with each other, to increase the binding force of the wavelength conversion layer 210 and the scattering reflective substrate 220. Also, the direct contact of these two layers can reduce the distance between the light output surface and the scattering reflective substrate 220, therefore reducing the divergence of the light in the wavelength conversion layer 210. Similarly, the relationship between the scattering reflective layer 222 and the base plate 221 of the scattering reflective substrate 220 is similar.

When the wavelength conversion layer 210, the scattering reflective layer 222 and the base plate 221 are directly in contact with each other in the stack, the fabrication process of the wavelength conversion device shown in FIG. 2 can be as follows: First, a scattering material is coated on the base plate 221, to form the scattering reflective layer 222. The phosphor layer 210 is then coated on the scattering reflective layer 222. This fabrication process is simple and easy to achieve. The scattering reflective layer can be formed by mixing the scattering material and an adhesive and spray coated on the base plate. This method has relatively strong adhesion. The scattering material may also be mixed with sodium silicate or other inorganic adhesive and then adhered to the base plate 221. Although this method has relatively weak adhesion, it can withstand higher temperature.

To improve the high temperature resistance of the wavelength conversion device, another approach may be employed. First, a powder mixture of the second glass material and the white scattering material is coated on the surface of the base plate 221, and the powder mixture is sintered at a temperature higher than the melting temperature of the second glass material, to form the scattering reflective layer 222. Then, a powder mixture of the first glass material and the wavelength conversion material is coated on the surface of the scattering reflective layer 222, and the powder mixture is sintered at a temperature higher than the melting temperature of the first glass material, to form the wavelength conversion layer. To prevent the second glass in the scattering reflective layer 222 from melting when sintering the powder mixture of the first glass and the wavelength conversion material, the melting temperature of the first glass material should be lower than the melting temperature of the second glass material, and the sintering temperature for this step is higher than the melting temperature of the first glass material and lower than the melting temperature of the second glass material. Using the above methods, a wavelength conversion layer including the wavelength conversion material and the first glass material, and a scattering reflective layer including the white scattering material and the second glass material are formed. Because glass has higher melting point compared to silica gel and other conventional adhesive, it can withstand higher temperature, which gives the wavelength conversion device superior high temperature resistance. Moreover, because sintering is used, higher adhesion is achieved between the wavelength conversion layer and the scattering reflective layer and between the scattering reflective layer and the base plate.

In the embodiment shown in FIG. 2, to achieve total scattering reflection of the incident light, the scattering reflective layer need to have a relatively large thickness. This is because the scattering material easily forms aggregations, there are inevitably local regions in the scattering reflective layer that scatter less of even form pin holes, so that some incident later light is scattered insufficiently or not scattered at all (i.e. it directly passes through the pin holes), and passes through the scattering material. Therefore, the thickness of the scattering reflective layer needs to be sufficiently large to prevent pin holes and to ensure scattering reflection. However, on the one hand, the thicker the scattering reflective layer, the easier it is for the scattering materials to fall off, making the fabrication of the scattering reflective layer more difficult. On the other hand, the thicker the scattering reflective layer, the higher the thermal resistance between the wavelength conversion layer and the base plate, and the more difficult it is for the heat generated by the wavelength conversion layer to be conducted to the base plate and dissipated; this hinders heat dissipation of the wavelength conversion layer.

To achieve total scattering of the incident light and at the same time overcoming the above two problems, a preferred solution is to make the base plate 221 of the wavelength conversion device shown in FIG. 2 a mirror reflective plate; more specifically, the mirror reflective plate may be an aluminum reflective plate. This way, the scattering material of the scattering reflective layer 222 can be relatively thin; it only needs to scatter a part of the light incident on the third surface 222a; the scattered light will be output from the third surface 222a and the surface 222b which is opposite the third surface 222a, i.e. the fourth surface. The part of the incident light on the third surface 222a that is not scattered will transmits the scattering reflective layer 222 and exits the fourth surface 222b to the mirror reflective plate 221. The scattering reflective layer 222 reflects a part of the scattered light back by scattering reflection; the remaining scattered light that exits the fourth surface 222b and un-scattered light are both reflected back by the mirror reflective plate 221 in the form of mirror reflection; therefore ultimately, all light incident onto the scattering reflective substrate 220 will be output from the third surface 222a.

Compared to using mirror reflection to reflect all light, in this embodiment because most light is reflected by scattering reflection, even if the reflectivity of the mirror reflective plate decreases, the overall reflectivity is not significantly impacted.

For example, an aluminum reflective plate may be used as the mirror reflective plate. The aluminum surface is oxidized under prolonged high temperature operation, such that its reflectivity drops to 70-80%. In one experiment, the aluminum reflective plate is provided with a barium sulfate scattering material layer of 0.22 mm thickness, the reflectivity of the aluminum reflective plate is 80%, and approximately 90% of the incident light is reflected by the scattering reflective layer and approximately 10% of the incident light is reflected by the aluminum reflective plate; the observed efficiency of the wavelength conversion device is decreased by only 1% to 2% as compared to using an un-oxidized silver plated base plate. When the thickness of the barium sulfate scattering material layer is reduced to 0.12 mm, approximately 75% of the incident light is reflected by the scattering reflective layer and approximately 25% of the incident light is reflected by the aluminum reflective plate; the observed efficiency of the wavelength conversion device is decreased by about 5% as compared to using an un-oxidized silver plated base plate, but the thickness is reduced by more than 40%. It is empirically observed that to maintain an overall reflectivity of over 90% for the wavelength conversion device, it should be ensured that over 50% of the incident light is reflected by the scattering reflective layer. In practice, the scattering material layer cannot be made very thin, so for most scattering material layer, the 50% reflection requirement can be ensured.

Of course, for other mirror reflective plates, to maintain an overall reflectivity of over 90% for the wavelength conversion device, the amount of light that is allowed to reach the mirror reflective plate as a ratio of the total incident light of the wavelength conversion device is different. When the absorption of the light by the white scattering material is neglected, all light loss is caused by light absorption by the mirror reflective plate, then the amount of light reflected by the scattering reflective layer as a ratio of the incident light onto the wavelength conversion device should satisfy: $(1-R)(1-P) \leq 10\%$, where R is the reflectivity of the mirror reflective plate, and P is the ratio of the light reflected by the scattering reflective layer.

Such a wavelength conversion device can also reduce the difficulty in fabricating the scattering reflective layer, and facilitate heat dissipation of the wavelength conversion layer. It is seen that this structure is preferred for its advantages in efficiency, heat dissipation and ease of fabrication. Of course, the aluminum reflective plate may be replaced by other mirror reflective plate that can accomplish mirror reflection, to achieve similar effects.

In practice, to improve heat dissipation of the wavelength conversion layer, preferably, the wavelength conversion device further includes a drive device 230, for driving the wavelength conversion layer 210 and the scattering reflective substrate 220 to move, so that the light spot of the excitation light formed on the wavelength conversion layer 210 acts upon the wavelength conversion layer 210 along a predetermined path. This avoids the excitation light acting upon the same location of the wavelength conversion layer 210 for prolonged time periods, which could cause local high temperature on the wavelength conversion layer 210. This improves the heat dissipation of the wavelength conversion layer, reducing the negative effect of the scattering reflective layer. Specifically, in this embodiment, the drive device 230 drive the wavelength conversion layer 210 to rotate, so that the light spot of the excitation light formed on the wavelength conversion layer 210 acts upon the wavelength conversion layer 210 along a predetermined circular path. Preferably, the scattering reflective substrate 220 has a round plate shape, and the wavelength conversion layer 210 is a ring shape concentric with the round plate, and the drive device 230 is a cylindrical shaped motor and is coaxially attached to the wavelength conversion layer 210 and the scattering reflective substrate 220. In other embodiments of the present invention, the drive device can also drive the wavelength conversion layer to move in other manners, such as horizontal linear oscillation motion, etc.

It should be understood that the above two methods of improving heat dissipation for the wavelength conversion layer can be used in combination to achieve even better heat dissipation effects.

From the above two embodiments, it can be seen that the scattering reflective substrate 220 scatters at least a part of the light incident on the third surface 222a and output all of the light via the third surface 222a back to the wavelength conversion layer 210. By utilizing scattering reflection to at least partly replace mirror reflection, the light utilization efficiency may be increased.

Figure 3:
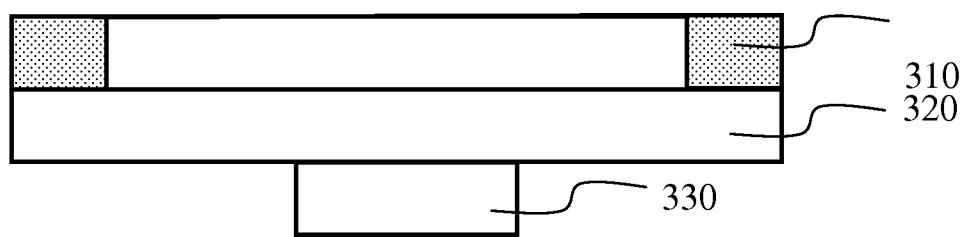
FIG. 3 illustrates the structure of a wavelength conversion device according to another embodiment of the present invention.

In the above embodiments, although using the base plate as a reflective plate can allow the thickness of the scattering reflective layer to be reduced, it does not completely solve the problem of the possible falling off of the scattering reflective layer. FIG. 3 illustrates the structure of a wavelength conversion device according to another embodiment of the present invention. As shown in FIG. 3, a difference between this wavelength conversion device and that shown in FIG. 2 is that, to solve the above problems, the reflective substrate 320 in this embodiment is a white porous ceramic plate.

Porous ceramic has the advantage of good chemical stability, low density, high strength, non-toxic, corrosion resistant, high temperature resistant, etc., and can be used in many application areas such as carrier for catalyst, filtering agent for food and medicine, burner, sound absorber, aeronautical materials, etc. White porous ceramic also does not absorb light, and the porous property of porous ceramic makes it scatter and reflect light. Further, the porous ceramic plate 320 is in direct contact with the wavelength conversion layer 310, which functions to conduct and dissipate heat from the wavelength conversion layer 310.

Pure ceramic, such as glass, does not scatter incident light. Porous ceramic, however, has many air cavities, and the crystal lattice arrangements near the cavities are irregular, so the orientations of different crystal lattices are different. When light strikes on the lattices near the cavities, the light is subject to refraction or totally reflection, and light incident on different lattices near the same cavity will travel in different directions after refraction or totally reflection. Therefore, from a macroscopic standpoint, the light appears to have been scattered near the air cavity. When the white porous ceramic has a sufficient thickness, its effect is similar to the scattering reflective layer described earlier, i.e., the white porous ceramic can reflect all of the incident light. It has been confirmed by experiments that the reflectivity of white porous ceramic can be as high as 99%. This way, the white porous ceramic can directly replace the scattering reflective layer and the substrate of FIG. 2; since it is an integral unit, it avoids the problem of the scattering reflective layer falling off of the base plate.

Moreover, compared to scattering materials like barium sulfate, the scattering effect of white porous ceramic is more controllable, because the air cavities of the white porous ceramic are distributed more evenly, and their sizes can be controlled by selecting appropriate fabrication methods or parameters. On the other hand, scattering materials like barium sulfate are prone to aggregation, causing non-uniform distribution, and as a result, the incident light may transmit through certain areas without scattering; this means that relatively thick scattering materials need to be used to ensure effective scattering reflection. Therefore, scattering reflective layers made of white porous ceramic plate can be made thinner as compared to scattering reflective layer formed by other scattering materials.

In this embodiment, the white porous ceramic plate 320 may be aluminum oxide porous ceramic, which has a relative mature fabrication technology and reliable properties. In other embodiments, the white porous ceramic may also be aluminum nitride, silica, silicon nitride, silicon carbide, etc. These materials are similar to aluminum oxide porous ceramic in that they can achieve scattering reflection and can withstand high temperatures of over 1000 degrees C., so they can be used in ultra-high power light emitting devices.

The fabrication method of a wavelength conversion device using a white porous ceramic plate as the reflective substrate includes, similar to the embodiments described earlier, coating the wavelength conversion material on the white porous ceramic plate 320 to form a wavelength conversion layer 310. Compared to the embodiments described earlier, the overall fabrication process is greatly simplified.

To prevent the wavelength conversion material or adhesive material of the wavelength conversion layer 310 from penetrating into the air cavities of the porous ceramic plate, preferably, the sizes of the air cavities of the white porous ceramic are less than 1 micron. To achieve such small air cavities, a sol-gel method can be used to make the white porous ceramic plate. The sizes of the air cavities of the white porous ceramic plate made by such methods range from 2 nm to 100 nm.

However, one issue of porous ceramic plate is that its thermal conductivity is not high; thus, when the power of the excitation light is very high, the heat generated in the wavelength conversion layer 310 cannot be effectively conducted away, causing the wavelength conversion layer to reach high temperatures. Also, the area of the porous ceramic plate located at the light spot of the excitation light will have a relatively high temperature, while the surrounding areas will have a relatively low temperature; this may generate a large thermal stress at that location of the porous ceramic plate due to thermal expansion, potentially causing the porous ceramic plate to crack. Thus, to reduce the thermal stress of the white porous ceramic plate 320, one method is to provide a metal plate (not shown in the drawings) on and in direct contact with the surface of the white porous ceramic plate 320 that faces away from the wavelength conversion layer 310. This can enhance heat dissipation from the white porous ceramic plate 320, and in turn the heat dissipation from the wavelength conversion layer 310; therefore, their temperatures can be reduced and the thermal stress in the porous ceramic plate is reduced.

The specific fabrication method may involve: coating a layer of solder material, such as gold-tin solder or gold-tin-copper solder etc., on the porous ceramic plate using evaporation or sputtering; coating a silver layer on the metal plate; placing the coated surface of the porous ceramic plate and the coated surface of the metal plate in contact with each other and pressing them together; heating and melting the solder material; and cooling the plates. The porous ceramic plate and the metal plate are thus soldered together with good thermal contact. Of course, the two plates can also be directly adhered together using a thermally conductive silver adhesive.

On the other hand, the white porous ceramic plate 320 can be made thinner, to reduce the thermal resistance between the wavelength conversion layer 310 and the metal plate and enhance heat dissipation. However, if the white porous ceramic plate is too thin, it will not completely reflect the light incident on it and will transmit a portion of the light. In such a case, the overall reflectivity can be improved by providing a reflective layer on the metal plate, using a principle similar to that of the previously described scattering reflective substrate that includes a scattering reflective layer and a reflective plate. Also, the sizes of the air cavities may be reduced, because the smaller the air cavity, the higher the scattering effect of the white porous ceramic.

Another way of reducing the thermal stress of the white porous ceramic in this embodiment, similar to the situation of the earlier-described wavelength conversion device that includes a scattering reflective layer, is to provide a drive device 330 in the wavelength conversion device to improve the heat dissipation for the wavelength conversion layer. This way, the heat is evenly distributed in the areas illuminated by the excitation light spot, which lowers the maximum temperature on the surface of the wavelength conversion device and reduces the thermal stress. It can be understood that the metal plate for heat dissipation and the drive device can be used in combination to achieve better heat dissipation result.

The wavelength conversion device of this embodiment has good temperature resistance and can be used in high power light emitting devices. Further, due to the scattering reflective substrate, the incident light can be sufficiently scattered into a Lambertian distribution, which is the same as the output light distribution of the phosphor material; thus, the wavelength conversion device can be used in a light emitting devices to generate uniformly mixed light.

Figure 4:
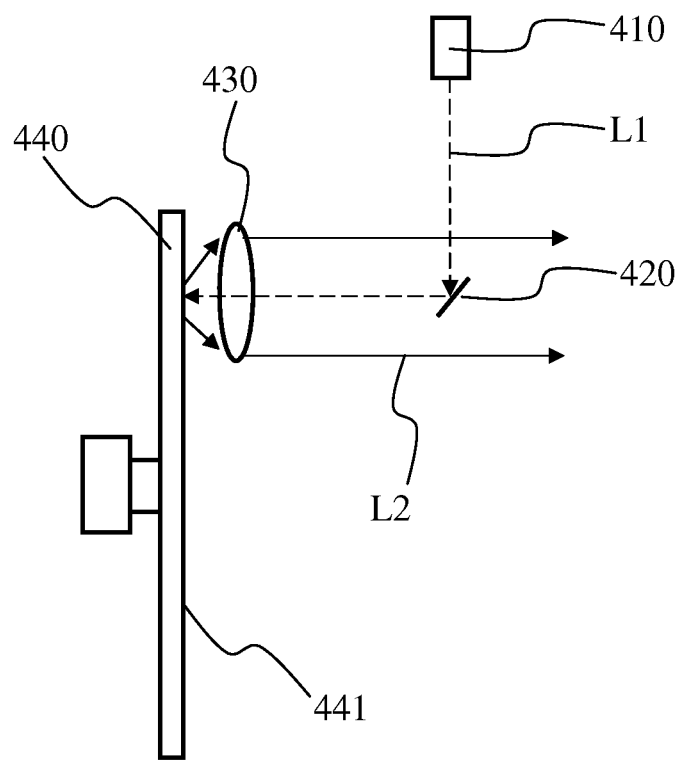
FIG. 4 illustrates the structure of a light emitting device according to an embodiment of the present invention.

FIG. 4 illustrates the structure of a light emitting device according to an embodiment of the present invention. As shown in FIG. 4, the light emitting device includes a first light source 410, a light combination device 420, a collection lens 430, and a wavelength conversion device 440.

The first light source 410 outputs a laser excitation light L1, which is reflected by the light combination device 420 to the first surface 441 of the wavelength conversion device 440. The light combination device is a reflector, and the wavelength conversion device 440 can be any of the wavelength conversion devices described earlier or a variation thereof. The wavelength conversion device 440 converts a portion of the laser excitation light L1 to a converted light, and scattering reflects the remaining un-absorbed portion of the laser excitation light L1; the mixed light L2 of the converted light and the remaining portion of the of the laser excitation light is output via the first surface 441.

Because the light with Lambertian distribution has a relatively large etendue, the light will diverge after a distance, making it difficult to collect. Therefore, in this embodiment, the light emitting device includes a collection lens 430, disposed in the optical path between the reflector 420 and the wavelength conversion device 440, to collimate the output light L2 from the wavelength conversion device 440 and output it to the reflector 420. Of course, if it is desired to reduce cost and size of the device at the expense of light utilization efficiency, the collection lens may be omitted.

Because laser light has a relatively small etendue and relatively small beam cross-section, the reflector 420 may have a relatively small area and still fully reflect the laser excitation light. On the other hand, the mixed output light L2 from the wavelength conversion device 440 has a Lambertian distribution; even after the collimation lens 430, its cross-section is relatively large, so a majority of the mixed light L2 will pass through the area around the reflector 420 to reach downstream optical elements, and only a small portion of this light is reflected by the reflector 420 toward the first light source 410 and become lost. In other embodiments of this invention, light from the first light source 410 can also be incident on the wavelength conversion device 440 at an oblique angle, which will eliminate the need for a reflector 420.

Because the converted light generated by the phosphor material has a Lambertian distribution, while laser light has a Gaussian distribution, in conventional wavelength conversion devices, the laser excitation light after reflection by a high reflection layer will retain a Gaussian distribution. Although the phosphor material will scatter the laser excitation light to a certain extent, such scattering by the phosphor material is insufficient to change the laser excitation light into a Lambertian distribution like the converted light; therefore, the laser excitation light and the converted light outputted from the wavelength conversion device are not uniformly mixed. In the wavelength conversion device of this embodiment, however, due to the use of the scattering reflective layer, the un-absorbed portion of the laser excitation light is scattered by the scattering reflective substrate into a Lambertian distribution, so it can be more uniformed mixed with the converted light.

Further, the light combination device 420 of the light emitting device may be a reflector with an aperture; in this case, the laser excitation light is perpendicular to the wavelength conversion device and is incident on the wavelength conversion device through the aperture, while a majority of the output light of the wavelength conversion device is reflected by the areas of the reflector around the aperture to be utilized, and a small portion of the output light passes through the aperture and become lost.

The light emitting device of this embodiment may be used in a white light source device; for example, the excitation light is a blue laser light, and the wavelength conversion device includes a yellow phosphor material; the blue laser light excites the yellow phosphor material to generate a yellow light. The yellow light and the remaining blue light both have a Lambertian distribution and are mixed into a uniform white light. Of course, the laser light source and the wavelength conversion material can be chosen based on need, and are not limited to the examples given here.

Figure 5:
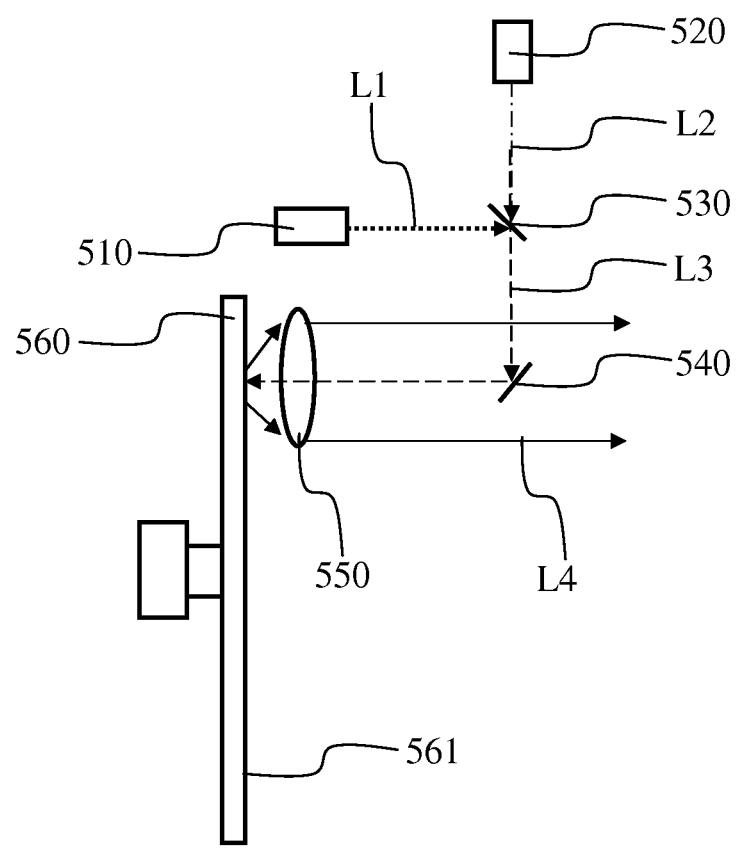
FIG. 5 illustrates the structure of a light emitting device according to another embodiment of the present invention.

Because the red component in the yellow light tends to be weak, if it is directly used in a projection display, the brightness of the red component in the projected images tends to be relatively low, causing unsatisfactory display effect. Thus, to improve image quality of the projection system, a red light may be supplemented for the light emitting device of FIG. 4. FIG. 5 illustrates the structure of a light emitting device according to another embodiment of the present invention. As shown in FIG. 5, the light emitting device includes a first light source 510, a second light source 520, a filter plate 530, a light combination device, a collection lens 550, and a wavelength conversion device 560.

The first light source 510 outputs a first color light L1; specifically, the first light source is a blue laser source and the first color light L1 is a blue laser light. The second light source 520 outputs a second color light L2; specifically, the second light source is a red laser source and the second color light L2 is a red laser light.

The light combination device includes a first region and a second region surrounding the first region. In this embodiment, the first region is a reflector 540, and the second region is the region around the reflector (not shown in the drawings).

The first color light L1 and the second color light L2 are combined by the filter plate 530 into one beam which is incident on the reflector 540 (i.e. the first region of the light combination device). Here the filter plate 530 combines the first color light L1 and the second color light L2 based on their different wavelengths, e.g., by transmitting red light and reflecting blue light. Of course, the first color light L1 and the second color light L2 can be combined using other methods. For example, the filter plate 530 may be replaced by a polarizer plate, and the first color light L1 and the second color light L2 may be given different polarization states which are respectively reflected and transmitted by the polarizer plate. Or, the filter plate 530 and the light combination device may be omitted from the light emitting device, where the first color light L1 and the second color light L2 are directly incident onto the first surface 561 of the wavelength conversion device 560 at different oblique angles.

The mixed light L3 of the first color light L1 and the second color light L2 is reflected by the reflector 540 to the first surface 561 of the wavelength conversion device 560. The wavelength conversion device 560 includes a yellow phosphor material which can absorb a portion of the first color light L1 and convert it to a converted light which is a yellow light. The un-absorbed portion of the first color light L1 is scattering reflected and outputted from the first surface 561 together with the converted light. The wavelength conversion device 560 does not absorb the second color light; it scattering reflects this light outputs it from the first surface 561.

The output light L4 of the wavelength conversion device 560 is collimated by the collection lens 550; a majority of this light passes through the region around the reflector 540 (i.e. the second region of the light combination device), and a small portion of it is reflected by the reflector 540 (i.e. the first region of the light combination device) and become lost. The light emitting device can generate a uniformly mixed white light.

In this embodiment, the red laser light is not absorbed by the yellow phosphor material when it passes through the wavelength conversion layer; a small portion of it is scattered by the phosphor material and exits the first surface of the wavelength conversion device, while the vast majority of it is incident on the scattering reflective substrate, is scattering reflected, and ultimately exits the first surface of the wavelength conversion device. The red laser light outputted from the first surface is changed from a Gaussian distribution to a Lambertian distribution. As compared to the situation where the red laser light is reflected by a highly reflective layer and retains a near-Gaussian distribution, the reflected red laser light in this embodiment has a distribution more similar to that of the converted light and can be more uniformly mixed with the converted light.

It should be noted that in this embodiment, the light emitting device outputs a white light which is a mixture of a blue light, a yellow light and a red light. When the light emitting device needs to output a yellow light, the device can be made so that almost all blue laser light is absorbed by the wavelength conversion material, or so that the second region of the light combination device is a filter plate which transmits the converted light and the second color light but reflects the first color light.

In this embodiment, the reflector 540 can reflect the first color light and the second color light, but also reflect the converted light, causing this portion of the converted light to be lost. To increase the output efficiency of the converted light, the reflector may be replaced by a filter plate that transmits the converted light and reflect the first color light and the second color light.

Further, the light combination device may be a filter plate with an aperture, where the aperture is the first region of the light combination device which transmits the first color light, the second color light and the converted light, while the region of the filter plate surrounding the aperture is the second region which reflects the converted light, the first color light and the second color light. In this case, the first color light and the second color light pass through the aperture to illuminate the wavelength conversion device. To increase the utilization rate of the converted light, the aperture may be covered with a filter plate, which transmits the first color light and the second color light and reflects the converted light. When the first color light is not needed in the output light, the second region may be made to reflect the converted light and the second color light and transmit the first color light.

Figure 6:
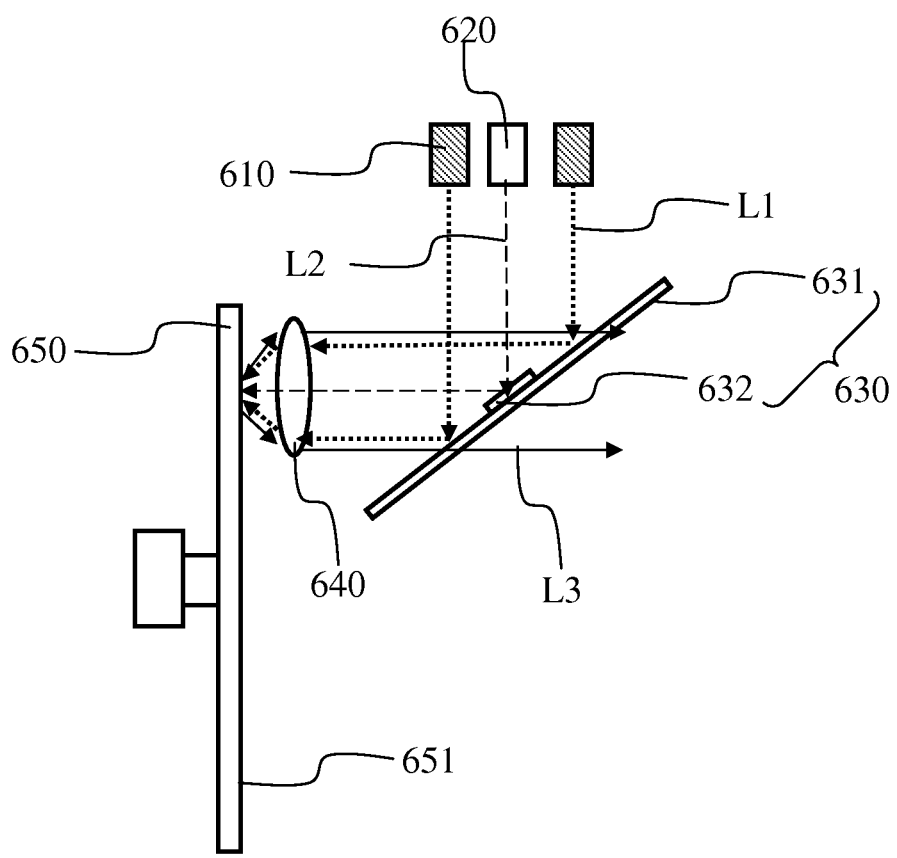
FIG. 6 illustrates the structure of a light emitting device according to another embodiment of the present invention.

In fact, in the light emitting device of FIG. 5, since the amount of red light to be supplemented in the light emitting device is relatively small, it is not necessary to first combine the red light and the blue laser light using wavelength-based combination; rather, other light combination means may be used to save space. FIG. 6 illustrates the structure of a light emitting device according to another embodiment of the present invention. As shown in FIG. 6, the light emitting device includes a first light source 610, a second light source 620, a light combination device 630, a collection lens 640, and a wavelength conversion device 650.

Differences between the light emitting device of this embodiment and that of FIG. 5 include:

(1) The first light source 610 is a blue laser source, the second light source 620 is a red laser source, and the first light source 610 surrounds the second light source 620 in spatial arrangement. The first color light L1 outputted by the first light source 610 is a blue laser light, and the second color light L2 outputted by the second light source 620 is a red laser light.

(2) Corresponding to the spatial arrangement of the first light source 610 and the second light source 620, the light combination device 630 of the light emitting device includes stacked reflecting element 632 and filter plate 631, where the reflecting element 632 is located in a center region on the surface of the filter plate 631 that faces the wavelength conversion device 650. The reflective element 632 is the first region, and the region of the filter plate 631 not covered by the reflective element 632 is the second region. The filter plate 631 reflects blue light and transmits yellow and red lights. The second color light L2 is incident on the reflective element 632 and reflected by it. Because the amount of supplemental red light required is relatively small, the number of laser diodes in the red laser source is relatively small, so the area of the reflective element 632 can be much smaller than the filter plate 631. The first color light L1 is incident on the region of the filter plate 631 not covered by the reflective element 632, i.e. the second region, and is reflected by it. The first color light L1 and the second color light L2 are both reflected by the light combination device 630 to the collection lens 640, and focused to the first surface 651 of the wavelength conversion device 650.

Similar to the embodiment of FIG. 5, the blue laser light L1 is converted by the wavelength conversion device 650 to a yellow converted light with a Lambertian distribution, and the red laser light L2 is scattering reflected by the wavelength conversion device 650 into a Lambertian distribution; the yellow converted light and the red laser light are output from the first surface 651 and form a uniformly mixed light L3. Compared to the situation where the substrate of the wavelength conversion device is a highly reflective layer without a scattering reflective layer, in this embodiment, the mixed light L3 outputted by the wavelength conversion device 650 is more uniform. A majority of this mixed light L3 is transmitted through the region of the filter plate 631 of the light combination device that is not covered by the reflective element 632; a small amount of this light is reflected by the reflective element 632 and become lost.

Here, the reflective element 632 of the light combination device 630 may be replaced by a filter plate that reflects red light and transmits yellow light, to increase the utilization rate of the yellow converted light. This filter plate can further be made to transmit or reflect the un-absorbed first color light depending on need. In addition, the light combination device 630 can be implemented by local coating, but the fabrication for such a structure is more complex and the cost is higher as compared to using two stacked elements (i.e. adhered together with a transparent adhesive).

It should be understood that the light combination device 630 of this embodiment can be implemented by a filter plate with an aperture, where the aperture constitutes the first region which transmits the first color light (blue light), the second color light (red light) and the yellow converted light, and the region around the aperture constitutes the second region which transmits blue light and reflects red and yellow lights. In this case the first color light and the second color light are disposed to incident on the wavelength conversion device perpendicularly; the second color light passes through the aperture to reach the wavelength conversion device, and the first color light passes through the second region to reach the wavelength conversion device. A majority of the output light of the wavelength conversion device will be reflected by the region of the filter plate around the aperture to be utilized, while a small amount passes through the aperture and becomes lost. Similarly, a filter plate can be provided in the aperture region, which transmits the second color light and reflects the yellow converted light to increase the utilization of the converted light; this filter plate can further be made to transmit or reflect the un-absorbed first color light depending on need.

It should be noted that, as compared to the light emitting device of the embodiment of FIG. 5, in the current embodiment, even if un-absorbed blue light is output by the wavelength conversion device 650, it cannot transmit the light combination device 630 to be output, so the output of the light emitting device is a yellow light. To obtain a white output light, the light emitting device may further include another blue light source (not shown in the drawings) having a wavelength different from that of the first light source 610, to be combined with the yellow light. For example, this blue light source can be provided on a side opposite the first light source 610 and the second light source 620, so the output of this blue light source is incident on the filter plate 631 of the light splitting device from a direction opposite the incident direction of the first color light L1 and the second color light L2. The filter plate 631 has the optical property that reflects the light of the blue light source and the blue light form the first light source and transmits the red light and the yellow converted light, so that it combines the yellow converted light, the un-absorbed red light and the light of the blue light source into one beam of output light.

The various embodiments in this disclosure are described in a progressive manner such that each embodiment is described by emphasizing its differences from other embodiments. The common features of the various embodiments can be understood by reference to each other.

Another embodiment of the present invention is a projection system, which includes a light emitting device that has the structures and functions of the light emitting devices described in the above embodiments. The projection system may use a variety of suitable projection technologies, such as liquid crystal display (LCD) projection technology, digital light processor (DLP) projection technology, etc.

The above descriptions illustrate the various embodiments and implementations of the present invention, and do not limit the scope of the invention. Equivalent structures or processes based on the disclosure of this specification and drawings, or their direct or indirect applications in other related technology areas, are within the scope of protection of this invention.

What is claimed is:
1. A wavelength conversion device, including:
a wavelength conversion layer, having a first surface and a second surface opposite each other, wherein the first surface is disposed to receive an excitation light, wherein the wavelength conversion layer absorbs the excitation light to generate a converted light, and outputs the converted light or a mixed light of the converted light and the excitation light from the first surface and the second surface; and
a scattering reflective substrate which is stacked with the wavelength conversion layer, the scattering reflective substrate including a white porous ceramic or a white scattering material, the white scattering material being a salt or an oxide, the white porous ceramic or white scattering material scattering a light incident on it, wherein the scattering reflective substrate has a third surface facing the second surface, the scattering reflective substrate scattering at least a portion of the light incident on the third surface and outputting all of the light incident on the third surface to the second surface;
wherein the scattering reflective substrate includes a scattering reflective layer and a base plate stacked together;

wherein the scattering reflective layer includes a white scattering material, and is located between the base plate and the wavelength conversion layer and affixed to the base plate, wherein the surface of the scattering reflective layer that faces the wavelength conversion layer is the third surface of the scattering reflective substrate, and a surface of the scattering reflective layer opposite the third surface is a fourth surface, wherein the scattering reflective layer scatters a portion of the light incident on the third surface and outputs the scattered light from the third surface and the fourth surface, and further transmits a remaining portion of the light incident on the third surface via the fourth surface; and wherein the base plate is a reflecting mirror plate, which reflects light incident on it from the fourth surface of the scattering reflective layer back to the fourth surface.

2. The wavelength conversion device of claim 1, further comprising:

a drive device for driving the wavelength conversion layer and the scattering reflective substrate to move, so that a light spot of the excitation light formed on the wavelength conversion layer acts upon the wavelength conversion layer along a predetermined path.

3. The wavelength conversion device of claim 1, wherein the scattering reflective substrate includes a white porous ceramic plate.

4. The wavelength conversion device of claim 3, wherein diameters of pores of the white porous ceramic plate are less than or equal to 1 micron.

5. The wavelength conversion device of claim 3, wherein the base plate is a metal plate.

6. The wavelength conversion device of claim 1, wherein a reflectivity of the reflecting mirror plate is R, wherein the scattering reflective layer scatters a portion of the light incident on the third surface and outputs the scattered light from the third surface and the fourth surface, wherein a ratio of the light scattered and outputted from the third surface to the light incident on the third surface is P, wherein $(1-R)(1-P) \leq 10\%$, and wherein $R \geq 50\%$.

7. The wavelength conversion device of claim 1, wherein the wavelength conversion layer includes a wavelength conversion material and an inorganic adhesive, wherein the inorganic adhesive adheres the wavelength conversion material into a solid mass.

8. A wavelength conversion device, comprising:

a wavelength conversion layer, having a first surface and a second surface opposite each other, wherein the first surface is disposed to receive an excitation light, wherein the wavelength conversion layer absorbs the excitation light to generate a converted light, and outputs the converted light or a mixed light of the converted light and the excitation light from the first surface and the second surface; and a scattering reflective substrate which is stacked with the wavelength conversion layer, the scattering reflective substrate including a white scattering material, the white scattering material being a salt or an oxide, the white scattering material scattering a light incident on it, wherein the scattering reflective substrate has a third surface facing the second surface, the scattering reflective substrate scattering at least a portion of the light incident on the third surface and outputting all of the light incident on the third surface to the second surface;

wherein the wavelength conversion layer includes a first glass material and a wavelength conversion material mixed together, wherein the scattering reflective layer includes a second glass material and a white scattering material mixed together, and wherein a melting point of the first glass material is lower than a melting point of the second glass material.

9. A light emitting device, comprising:

a first light source;

a wavelength conversion device, which includes:

a wavelength conversion layer, having a first surface and a second surface opposite each other, wherein the first surface is disposed to receive an excitation light from the first light source, wherein the wavelength conversion layer absorbs the excitation light to generate a converted light, and outputs the converted light or a mixed light of the converted light and the excitation light from the first surface and the second surface; and a scattering reflective substrate which is stacked with the wavelength conversion layer, the scattering reflective substrate including a white porous ceramic or a white scattering material, the white scattering material being a salt or an oxide, the white porous ceramic or white scattering material scattering a light incident on it, wherein the scattering reflective substrate has a third surface facing the second surface, the scattering reflective substrate scattering at least a portion of the light incident on the third surface and outputting all of the light incident on the third surface to the second surface;

a second light source; and a light combination device;

wherein the first light source is a laser source for outputting a first color light, the second light source is a laser source for outputting a second color light, and wherein the first color light is the excitation light;

wherein the light combination device includes a first region and a second region surrounding the first region, wherein the first color light and the second color light are incident on the first region of the light combination device from a same direction;

wherein the first region has an optical property that transmits the first color light and the second color light, and the second region has an optical property that reflects the converted light and the second color light, and wherein the first color light and the second color light are transmitted through the first region to the first surface of the wavelength conversion device; or wherein the first region has an optical property that reflects the first color light and the second color light, and the second region has an optical property that transmits the converted light and the second color light, and wherein the first color light and the second color light are reflected by the first region to the first surface of the wavelength conversion device;

wherein the converted light or a mixed light of the converted light and un-absorbed first color light is output from the first surface to the light combination device, wherein the wavelength conversion device scattering reflects the second color light without absorbing it and outputs it from the first surface to the light combination device.

10. The light emitting device of claim 9, wherein the first light source is a laser source for outputting a laser excitation light to the first surface of the wavelength conversion device, wherein the wavelength conversion device receives the laser excitation light and converts a portion of the laser excitation light to the converted light, and scattering reflects un-absorbed laser excitation light, wherein the converted light and the un-absorbed laser excitation light are output from the first surface.

11. A projection system, comprising the light emitting device of claim 9.

12. A light emitting device, comprising:
a first light source;
a wavelength conversion device, which includes:
    a wavelength conversion layer, having a first surface and a second surface opposite each other, wherein the first surface is disposed to receive an excitation light from the first light source, wherein the wavelength conversion layer absorbs the excitation light to generate a converted light, and outputs the converted light or a mixed light of the converted light and the excitation light from the first surface and the second surface; and
    a scattering reflective substrate which is stacked with the wavelength conversion layer, the scattering reflective substrate including a white porous ceramic or a white scattering material, the white scattering material being a salt or an oxide, the white porous ceramic or white scattering material scattering a light incident on it, wherein the scattering reflective substrate has a third surface facing the second surface, the scattering reflective substrate scattering at least a portion of the light incident on the third surface and outputting all of the light incident on the third surface to the second surface;
a second light source; and
a light combination device;
wherein the first light source surrounds the second light source, wherein the first light source outputs a first color light, wherein the second light source is a laser source for outputting a second color light, and wherein the first color light is the excitation light;
wherein the light combination device includes a first region and a second region surrounding the first region, wherein the first color light and the second color light are respectively incident on the second region and first region of the light combination device from a same direction;
wherein the first region has an optical property that reflects the second color light, and the second region has an optical property that reflects the first color light and transmits the second color light and the converted light, and wherein the first color light and the second color light are respectively reflected by the second region and the first region to the first surface of the wavelength conversion device; or
the first region has an optical property that transmits the second color light, and the second region has an optical property that transmits the first color light and reflects the second color light and the converted light, and wherein the first color light and the second color light are respectively transmitted through the second region and the first region to the first surface of the wavelength conversion device;
wherein the converted light or a mixed light of the converted light and un-absorbed first color light is output from the first surface to the light combination device, wherein the wavelength conversion device scattering reflects the second color light without absorbing it and outputs it from the first surface to the light combination device.

13. A projection system, comprising the light emitting device of claim 12.

14. The light emitting device of claim 12, wherein the first light source is a laser source for outputting a laser excitation light to the first surface of the wavelength conversion device, wherein the wavelength conversion device receives the laser excitation light and converts a portion of the laser excitation light to the converted light, and scattering reflects un-absorbed laser excitation light, wherein the converted light and the un-absorbed laser excitation light are output from the first surface.

* * * * *